(12) United States Patent
Fuks et al.

(10) Patent No.: US 7,686,312 B2
(45) Date of Patent: Mar. 30, 2010

(54) BLANK FOR AN AXLE BEAM, WHEEL SUSPENSION COMPRISING AN AXLE AND A METHOD FOR MANUFACTURING AN AXLE

(75) Inventors: Leon Fuks, Angered (SE); Roland Svensson, Väröbacka (SE)

(73) Assignee: Volvo Lastvagnar AB, Gothenburg (SE)

( * ) Notice: Subject to any disclaimer, the term of this patent is extended or adjusted under 35 U.S.C. 154(b) by 449 days.

(21) Appl. No.: 11/572,328

(22) PCT Filed: Aug. 30, 2005

(86) PCT No.: PCT/SE2005/001255

§ 371 (c)(1),
(2), (4) Date: Jan. 19, 2007

(87) PCT Pub. No.: WO2006/041348

PCT Pub. Date: Apr. 20, 2006

(65) Prior Publication Data

US 2008/0303236 A1  Dec. 11, 2008

(30) Foreign Application Priority Data

Sep. 9, 2004  (SE) .................................... 0402194

(51) Int. Cl.
*B60B 35/00* (2006.01)
*B62D 7/18* (2006.01)

(52) U.S. Cl. .............................. 280/93.512; 280/93.51; 301/124.1; 180/905

(58) Field of Classification Search ............ 280/93.512, 280/93.51, 93.511, 93.502, 124.166; 301/127, 301/124.1; 180/905
See application file for complete search history.

(56) References Cited

U.S. PATENT DOCUMENTS

| | | | | |
|---|---|---|---|---|
| 4,361,360 A | * | 11/1982 | Kuether | 301/127 |
| 5,052,528 A | * | 10/1991 | Sullivan | 188/317 |
| 5,429,423 A | * | 7/1995 | Pollock et al. | 301/124.1 |
| 5,588,660 A | | 12/1996 | Paddison | |
| 5,741,027 A | * | 4/1998 | Stroh et al. | 280/781 |
| 6,196,563 B1 | | 3/2001 | Haycraft | |
| 6,416,136 B1 | | 7/2002 | Smith | |
| 6,579,026 B2 | * | 6/2003 | Moses et al. | 403/158 |
| 6,616,156 B1 | * | 9/2003 | Dudding et al. | 280/93.512 |
| 6,799,811 B1 | | 10/2004 | Dauber et al. | |
| 2002/0159826 A1 | | 10/2002 | Moses et al. | |

OTHER PUBLICATIONS

Supplementary European Search Report from corresponding EP Patent Application No. 05774948.3.

* cited by examiner

*Primary Examiner*—Paul N Dickson
*Assistant Examiner*—Drew Brown
(74) *Attorney, Agent, or Firm*—WRB-IP LLP

(57) ABSTRACT

A blank for an axle beam intended to support a wheel axle is formed from a continuous piece and, at its respective ends, has, on the one hand, a bushing constituting a bearing for a kingpin for supporting a wheel spindle and, on the other hand, lug-shaped protrusions on each side of the bushing, and a wheel axle made from such a blank. The invention can provide a blank which is suitable both for steerable and non-steerable wheel axles for vehicles.

21 Claims, 7 Drawing Sheets

BLANK FOR AN AXLE BEAM, WHEEL SUSPENSION COMPRISING AN AXLE AND A METHOD FOR MANUFACTURING AN AXLE

BACKGROUND AND SUMMARY

The present invention relates to a blank for an axle beam, a wheel suspension, and a method for manufacturing an axle beam. It especially relates to a blank for an axle beam which is configured so as to be usable for both steerable wheel axles and fixed, non-steerable wheel axles, and to wheel suspensions comprising a machined such blank, and to a method for providing an axle beam from such a blank.

Axle beams are used to support wheel axles in vehicles. In the manufacture of heavy-duty vehicles such as, for example, trucks, high demands are placed upon flexibility for the satisfaction of specific customer requirements, so that the vehicle is adaptable to different applications. For this purpose, vehicles, especially trucks, are manufactured with both steerable wheel axles and non-steerable, fixed wheel axles. An example of such axles which can be configured so as to be both steerable and non-steerable is a non-driven pusher axle in a commercial vehicle.

According to the prior art, specific blanks are provided for axle beams for steered and non-steered wheel axles respectively. This means that two sets of blanks for axle beams must be stocked, which adds to the handling costs. In addition, it is more complicated to change a decision on the extent to which the axle beam shall be configured with fixed or steered wheel axle. In order to reduce the problems associated with separate stock-keeping, it has therefore been proposed to use the same axle beam for both steered and non-steered beams and to instead fix a wheel spindle, which is fitted to the axle beam, using a rod which connects the wheel spindle to the beam structure of the truck. The rod is therefore fastened at both its ends with a respective joint. The hitherto known solution has drawbacks in that a plurality of joints need to be provided and in that it is difficult to configure rod and fastening with sufficient precision, which means that the wheel can come to be set somewhat obliquely, possibly leading to increased fuel consumption. The known solutions have exhibited drawbacks as a result of the construction having become heavy, expensive and bulky, nor was it well matched to its unique application. Since the position of the wheels could not easily be set with sufficient precision, known solutions have sometimes caused unnecessary tire wear as a result of incorrect mounting of the wheels.

It is desirable to provide blanks for axle beams which can be used for both fixed, non-steerable wheel axles and for steerable wheel axles and by which the above problems are solved.

According to an aspect of the invention, a continuous blank, made in one piece, is used, which at each end has a bushing, comprising a bearing for a kingpin, and lug-shaped protrusions situated on each side of a plane through the longitudinal axes of said bushings. The lug-shaped protrusions have a first part, which, following machining of the lug-shaped protrusion, is suitable for use as a locking surface for a wheel-spindle, should the axle beam be used to support a fixed, non-steerable wheel axle, and that said lug-shaped protrusions have a second part, which is suitable for use as an end stop for limiting the deflection of the rotary motion of a wheel spindle after the lug-shaped protrusion is at least partially machined away, should the axle beam be used to support a steerable wheel axle. The same blank is therefore used for both steered and non-steered wheel axles. By machining is meant that material removes from the integrally made blank. Machining can be realized, for example, by milling, boring and grinding. Both the end stops for deflection limitation alternatively locking surfaces for the wheel spindle can thereby be formed from the lug-shaped protrusion. The fact that the locking surface is situated directly on the beam and is formed integrally therewith means that the wheel can be locked with good stability. In addition, machining can be realized with good precision, whereby the risk of tilting is reduced compared to if locking is realized via a rod.

In general terms, this can be explained by the fact that it is easier to achieve good accuracy if fewer components interact, since, with fewer components, the overall error tolerance is reduced. In addition, the placement of the surfaces which constitute end stops can be easily adapted to different requirements in respect of different vehicles, since the machining of the lug-shaped protrusion can then easily be adapted such that a different amount of material is machined away, in which case the end stop will be placed in the desired location. For the purpose of providing a locking surface, alternatively an end stop, the lug-shaped protrusion has a first part, which, following machining of the lug-shaped protrusion, is suitable for use as a locking surface, and a second part, which is suitable for use as an end stop for limiting the deflection of a rotary motion of a wheel spindle.

An axle beam for a steered wheel axle, alternatively a fixed, non-steered wheel axle, can therefore be formed from one blank.

The first part of the lug-shaped protrusion preferably lies farther from a midpoint of the axle beam in the longitudinal direction of the axle beam than does the second part. As a result of this configuration, the first part will lie closer to that surface of a wheel spindle which directly faces the axle beam than does the second part. In the event of an imaginary rotary motion of the wheel spindle about the kingpin in the clockwise or counterclockwise direction, the wheel spindle will come into contact with the first part before it comes into contact with the second part. Because of this, the first part can be configured to lock the wheel spindle of a non-steerable wheel axle and the second part can be configured to limit the rotary motion at an intended stop position for a steerable wheel axle. In order to use the blank for a steered wheel axle, the lug-shaped protrusion must therefore be machined such that the first part is removed. In this way, the wheel spindle is not secured against rotation, but rather a certain predetermined rotation is allowed up to the point where the end stop prevents further rotation. When the blank is to be used for an axle beam for a fixed axle, the second part does not-need to be removed. In this case, the second part must still be machined such that a bolt can be inserted through the first part, through a washer lying between the first part, and can be fastened in the wheel spindle for the application of a clamping force between the first part and the wheel spindle and thereby secure the wheel spindle against rotation. In this case, the second part is at least partially machined away in order to liberate a bearing surface for a fixing bolt in the first part, should the axle beam be used to support a fixed, non-steerable wheel axle.

In order easily to achieve locking between wheel spindle and axle beam, a locking surface of the first part is preferably placed beyond the center point, in the longitudinal direction of the axle beam, of a longitudinal axis of the bushing constituting a bearing for the kingpin.

Preferably, the lug-shaped protrusion is configured as shown in FIG. 2, i.e., with a nose-like shape having a narrower, lower, inner second part and a wider, taller, outer first part. By the first part being wider is meant that the first part has a greater extent along a longitudinal axis of the bushing constituting a bearing for the kingpin than does the second part. By the first part being taller is meant that the extent perpendicular to the longitudinal direction of the axle beam and perpendicular to said longitudinal axis of bushing is greater for the first part than the second part. The lug-shaped protrusion is in this case configured in a continuous piece comprising said first and second part and an intermediate piece in which the first part merges into the second part.

In the manufacture of an axle beam for a steerable wheel axle and an axle beam from a fixed, non-steerable wheel axle respectively, the protrusion is machined. In the first case, machining is carried out to provide a deflection-limiting surface and, in the second case, to provide a plane locking surface.

The invention also relates to a wheel suspension comprising a machined blank according to the above, which blank has been machined for use as an axle beam for a steerable wheel axle, and to a wheel suspension comprising a machined blank according to the above, which blank has been machined for use as an axle beam for a fixed, non-steerable wheel axle.

The invention also relates to a method for providing an axle beam for a steered wheel axle, alternatively an axle beam for a fixed, non-steered wheel axle, from the same blank.

BRIEF DESCRIPTION OF THE FIGURES

An embodiment of the invention will be described in greater detail below with reference to the appended drawing figures, in which.

DETAILED DESCRIPTION

Figure 1:
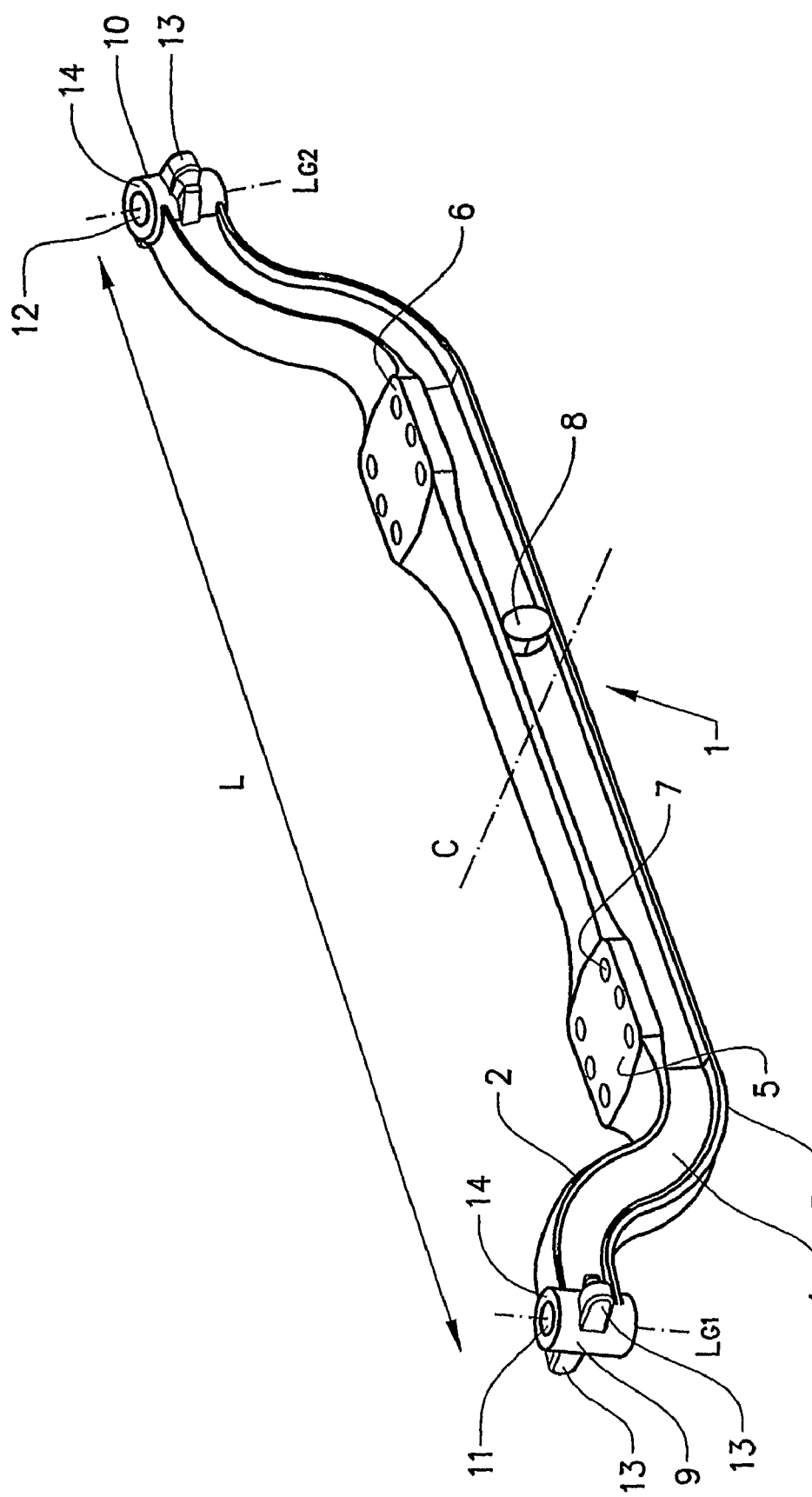
FIG. 1 shows a perspective view of a blank for an axle beam according to the invention.

In FIG. 1 is shown a blank 1 for an axle beam intended to support a wheel axle. The blank for the axle beam 1 extends in a substantially longitudinal direction L and has an upper and a lower flange 2, 3, which flanges extend in the longitudinal direction and are connected by a rib 4. The axle beam can conventionally be straight or have an extent in a plane through the rib which deviates from a straight beam, for example somewhat U-shaped as in the illustrative embodiment shown. Deviation from a straight axle beam is used in order easily to vary the frame height of the vehicle to which the axle beam is fitted. The axle beam also has fastening surfaces 5, 6, which are intended to be fastened to a beam structure present in a vehicle. The fastening surfaces have bushings 7, intended for the fitting of fastening elements for fastening the axle beam to a beam structure of a vehicle. In addition, in the embodiment shown, close to a midpoint C, with respect to the longitudinal direction L of the axle beam, of the blank for the axle beam's, there is an anchoring part 8, which is intended to be machined to produce a fastening for a steering cylinder, should the blank for the axle beam be used to support a steered wheel axle. The axle beam can also be configured without integrated anchoring part.

At the respective end 9, 10 of the blank for the axle beam, bushings 11, 12 are configured, which bushings 11, 12 are intended to support kingpins. The bushes extend along respective longitudinal axes LG1, LG2, which are somewhat angled in relation to each other and run in a plane through the rib of the axle beam. In order to provide the bushings 11, 12, the blank for the axle beam is configured with substantially cylindrical pieces 14, which have been configured at the respective end 9, 10 and in which the bushing runs along the axis of symmetry of the cylinder.

Adjoining the respective end 9, 10, there are lug-shaped protrusions 13 arranged on the blank 1. At each end 9, 10 there is a lug-shaped protrusion disposed on each side of a plane which is defined the longitudinal axes LG1/LG2 of the bushings. This plane coincides with a plane through the rib 4 of the blank for the axle beam.

The blank for the axle beam is made in one piece, comprising the beam with upper flange 2, lower flange 3, rib 4, cylindrical end pieces and the lug-shaped protrusions. The lug-shaped protrusions are therefore integrally made with the rest of the beam and are formed during the manufacture of the beam. The beam is preferably forged or cast in one piece.

Figure 2:
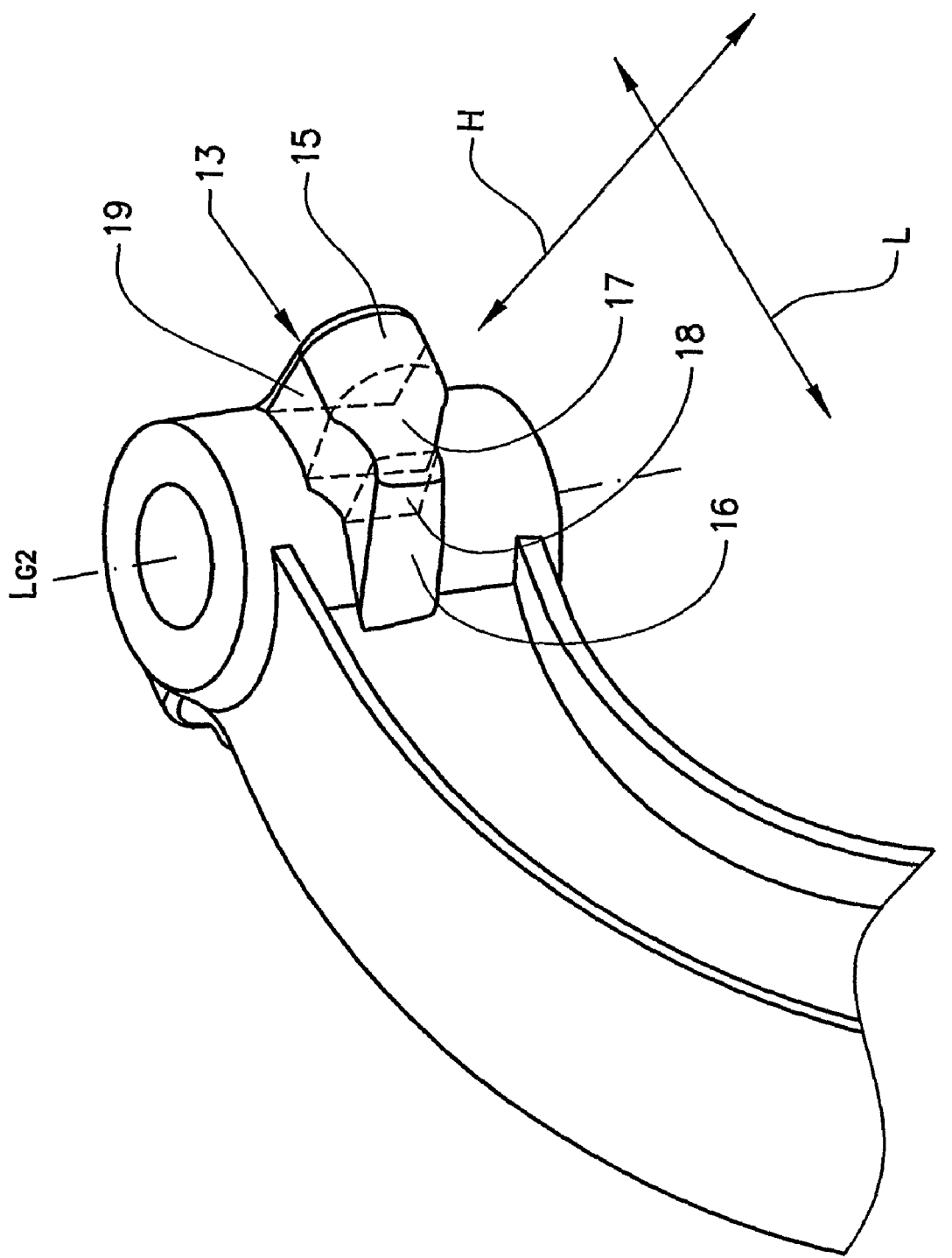
FIG. 2 shows in perspective view an enlargement of a lug-shaped protrusion on the blank for the axle beam.

In FIG. 2, a lug-shaped protrusion 13 is shown in more detail. The lug-shaped protrusion is configured with a nose-like shape having a wider, taller, outer first part 15 and a narrower, lower, inner second part 16. By the first part 15 being wider is meant that the first part 15 has a greater extent along a longitudinal axis LG2 of the bushing 12 constituting a bearing for a kingpin than does the second part 16. By the first part 15 being taller is meant that the extent in the direction H perpendicular to the longitudinal direction L of the axle beam and perpendicular to said longitudinal axis LG2 of the bushing 12 is greater for the first part 15 than the second part 16. The lug-shaped protrusion 13 is in this case configured in a continuous piece comprising said first 15 and second part 16 and an intermediate piece 17 in which the first part merges into the second part.

In the manufacture of an axle beam for a steerable wheel axle and an axle beam for a fixed, non-steerable wheel axle respectively, the protrusion 13 is machined, in the first case, to provide a deflection-limiting surface 18 and, in the second case, to provide a plane locking surface 19. The deflection-limiting surface 18 is more clearly apparent in FIG. 7, in which the lug-shaped protrusion has been machined to provide an axle beam for a steered wheel axle, and the plane locking surface 19 is more clearly apparent in FIG. 5, in which the lug-shaped protrusion has been machined to provide an axle beam for a fixed, non-steered wheel axle.

By machining is meant that material is removed from the lug-shaped protrusion. Machining can be realized, for example, by milling, boring and grinding. Both the end stops for deflection limitation, alternatively locking surfaces for the wheel spindle, can thereby be formed from the lug-shaped protrusion. In order to provide the deflection-limiting surface 18, the first part 15 and the intermediate piece 17 are essentially fully machined away, so that pivoting of a wheel spindle mounted in the bushing, to the point where a purpose-made surface on the wheel spindle bears against the deflection-limiting surface, is allowed. In order to provide the locking surface 19, the lug-shaped protrusion is machined to provide a plane surface disposed in a plane which is defined by a the longitudinal axis LG2 of the bushing 12 and the direction H.

Figure 3:
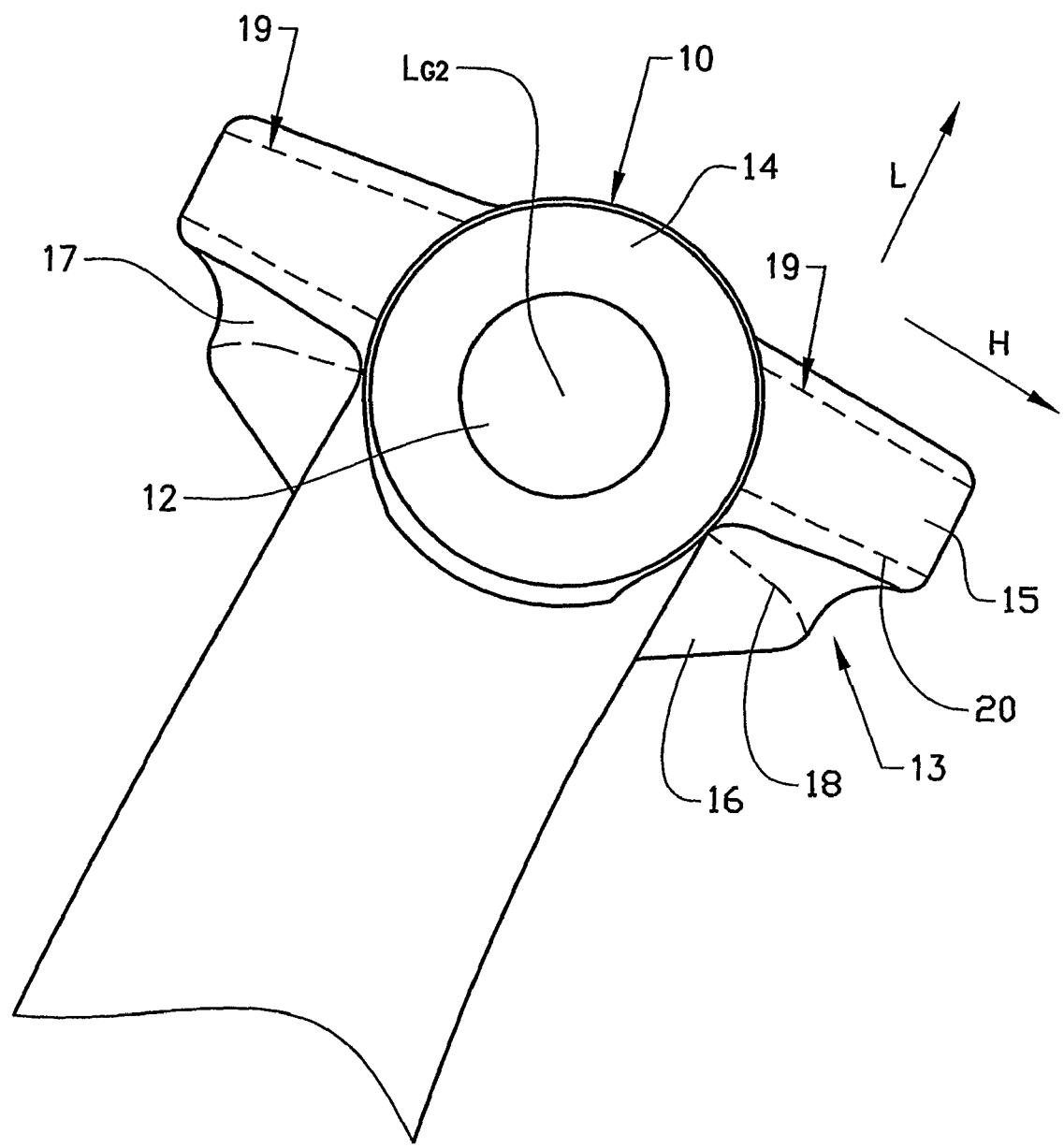
FIG. 3 shows, viewed from above, an enlargement of a lug-shaped protrusion on the blank for the axle beam.
Figure 5:
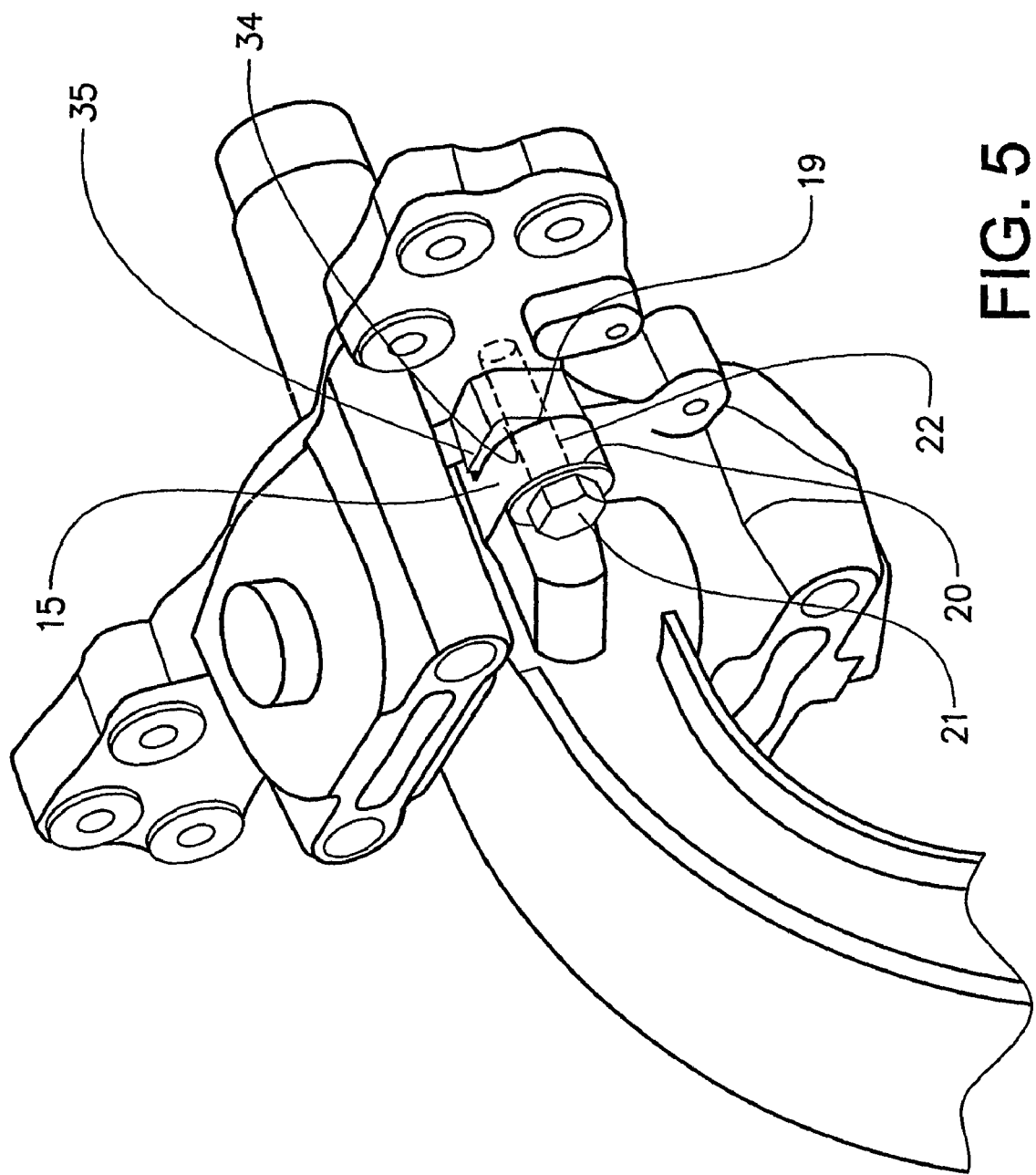
FIG. 5 shows in detail the fastening of the wheel spindle to the axle beam for the non-steerable axle.

In FIG. 3, one end 10 of the blank 1 for the axle beam is shown in detail. The end 10 has a cylindrical part 14 through which a cavity 12 for receiving a kingpin. The cavity is preferably configured as a bushing. As has been shown in FIG. 1, the first part 15 of the lug-shaped protrusion 13 lies farther from a midpoint C of the blank 1 for the axle beam in the longitudinal direction L of the axle beam than does the second part 16. The first part 15 is delimited by a locking surface 19, which preferably is configured as a section in a plane which runs along the longitudinal axis LG2 of the bushing 12 and in the direction H perpendicular to the longitudinal direction L of the axle beam. The first part 15 is further delimited by a bearing surface 20 for a fixing bolt 21 (FIG. 5). The bearing surface needs only constitute a plane piece against which the head of the bolt 21 can rest. The bearing surface 20 can therefore be produced from the lug-shaped protrusion 13 by boreholes or by milling-out of a cylindrical hole running in a direction along the longitudinal axis LG2 of the bushing 12 and perpendicular to the direction H. In addition, through the first part 15 a borehole 22 (FIG. 5) is made, through which a shank of the fixing bolt 21 shall run.

The second part 16 is delimited by a deflection-limiting surface 18, which forms a surface which is plane in a direction along the longitudinal axis LG2 and is curved about the longitudinal axis LG2. A purpose-made stop face (44, FIG. 7) on the wheel spindle will, upon maximum rotation of the wheel spindle, bear against a plane or relatively plane part of the second part constituting the deflection-limiting surface 18, whereupon the deflection-limiting surface 18 stops the pivot motion. Between the first part 15 and the second part 16 lies the intermediate part 17.

Figure 4:
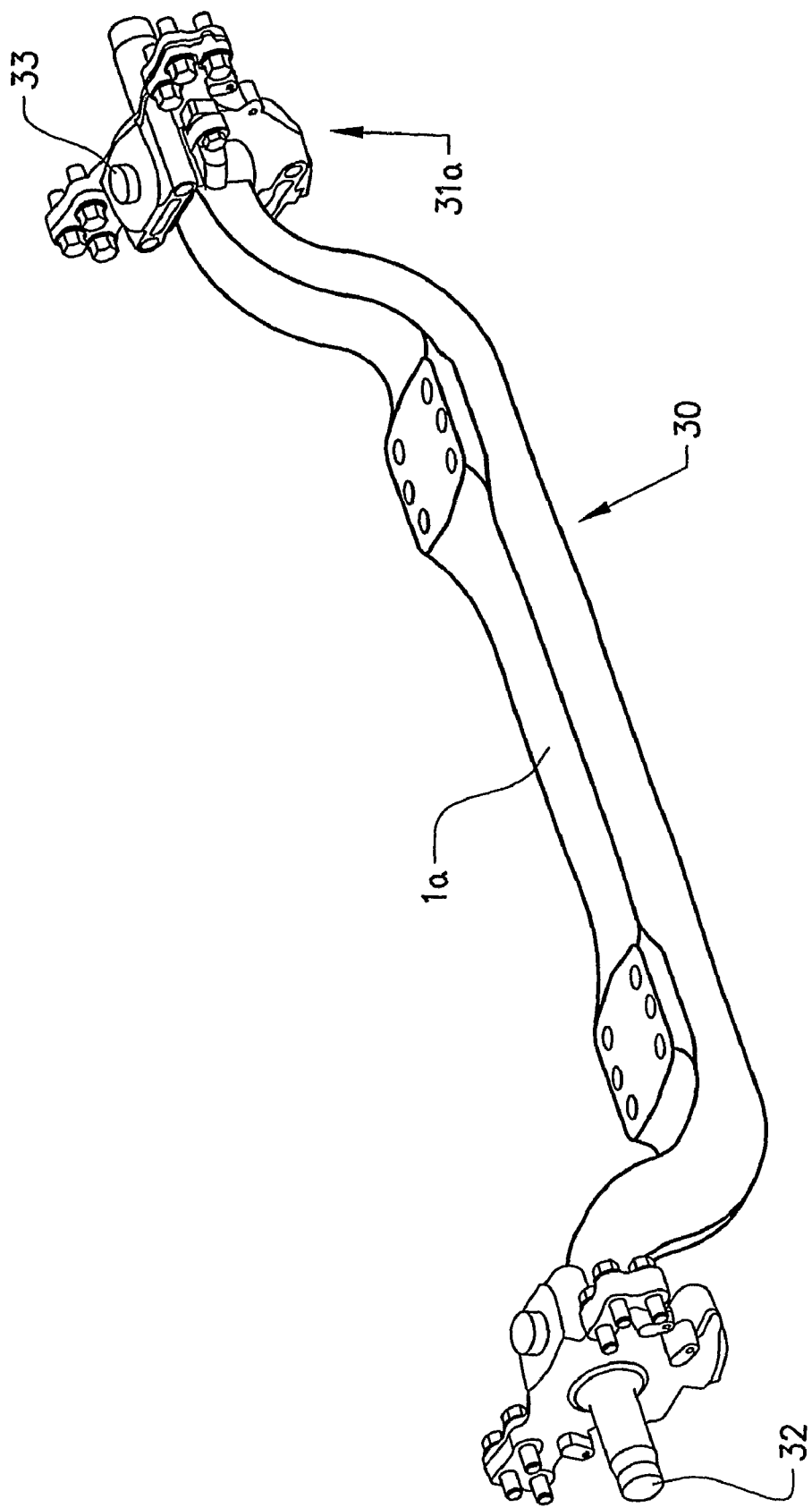
FIG. 4 shows a wheel suspension comprising an axle beam and a wheel spindle fixedly disposed in a non-pivotable manner at each end of the axle beam.

In FIG. 4 there is shown a wheel suspension 30 comprising an axle beam 1a and a wheel spindle 31a which is fixedly disposed in a non-pivotable manner at each end of the axle beam. The axle beam 1a is formed from a blank 1 configured as previously described and in which the locking surface 19 and the bearing surface 20 have been laid bare by machining of part lug-shaped protrusion 13. The wheel spindle 31a has a wheel axle 32 and a kingpin 33, which is mounted in a bushing. In this case, when the wheel axle is not pivotable, the bushing can be adapted to directly receive the kingpin without the provision of an intermediate bearing.

In FIG. 5, the fastening of the wheel spindle 31a to the axle beam 3 is shown in detail. In the figure, the locking surface 19 and the bearing surface 20 of the first part 15 are indicated. In addition, a bearing surface 34 of the wheel spindle is indicated. The locking surface 19 and the bearing surface 34 are pressed together, with an intermediate washer 35 placed between the surfaces, by the application of a clamping force via a bolt 21 running through the first part 15 and the washer 35. The washer 35 is preferably wedge-shaped and has an elongated bushing running in the longitudinal direction of the wedge. By the longitudinal direction of the wedge is meant the direction in which the gradient of the thickness of the wedge is at a maximum. In place of a washer, it is possible in an alternative embodiment to use shims.

Figure 6:
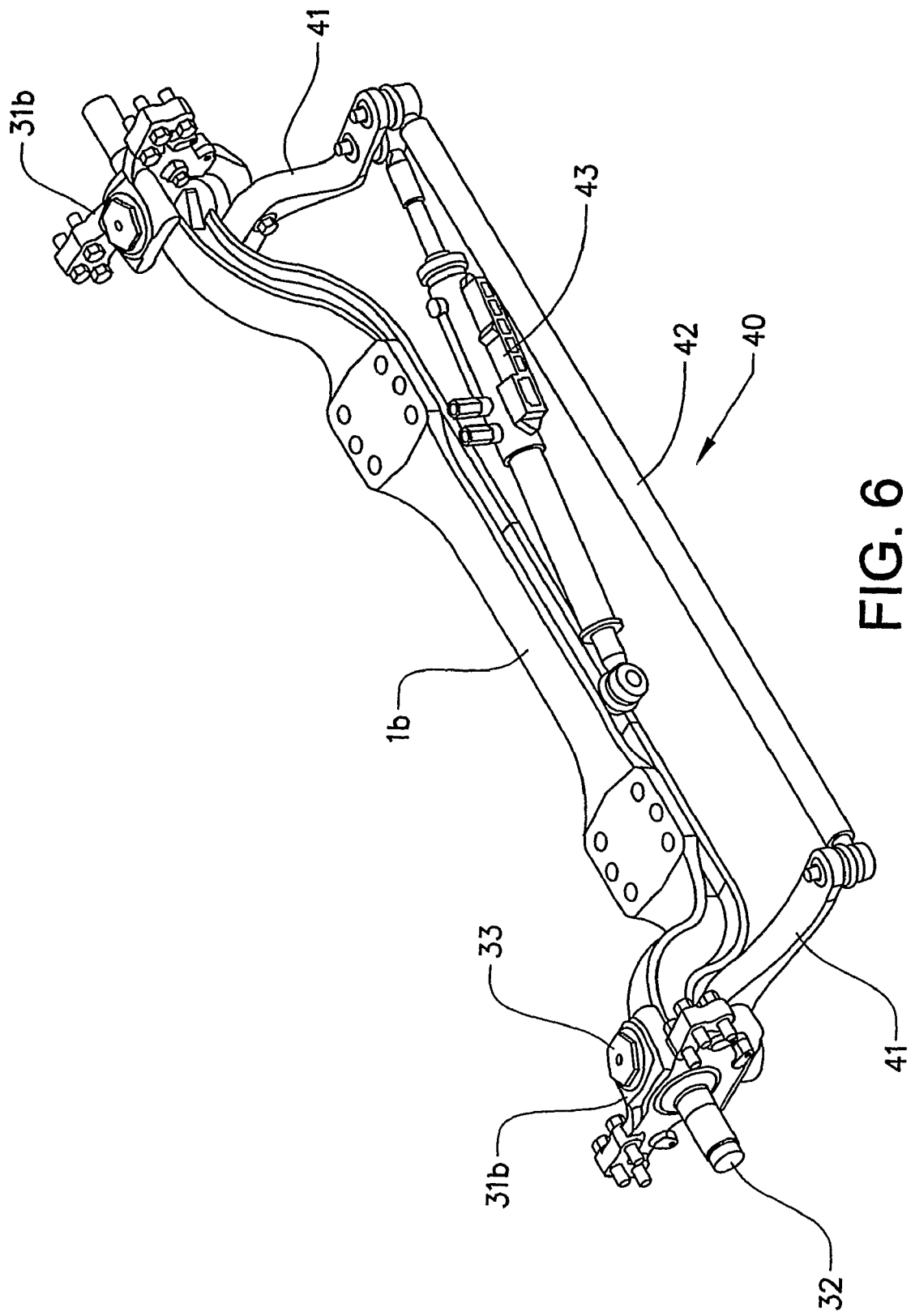
FIG. 6 shows a wheel suspension comprising an axle beam and a wheel spindle pivotably disposed at each end of the axle beam.

In FIG. 6, an example is shown of how steering rods and steering cylinders have been placed in a wheel suspension 40. The wheel suspension 40 comprises an axle beam 1b and a wheel spindle 31b which is pivotably disposed at each end of the axle beam. The axle beam 1b is formed from a blank 1, in the manner previously described, in which the deflection-limiting surface 18 has been laid bare by machining of the lug-shaped protrusion 13. The wheel spindle 31b has a wheel axle 32 and a kingpin 33, which is mounted in a bushing. In this case, when the wheel axle is pivotable, the bushing can be adapted to support the kingpin in intermediate bearings disposed in the bushing. The wheel spindle 31b also has steering rods 41, which at one end are fastened to the wheel spindle 31b and at the other end are fastened to a tie rod 42. As has been shown in the figure, the rotation of the wheel spindles can be achieved by the action of a steering cylinder 43, one end of which is fastened in the axle beam 1b and the other end in the one steering rod 41.

Figure 7:
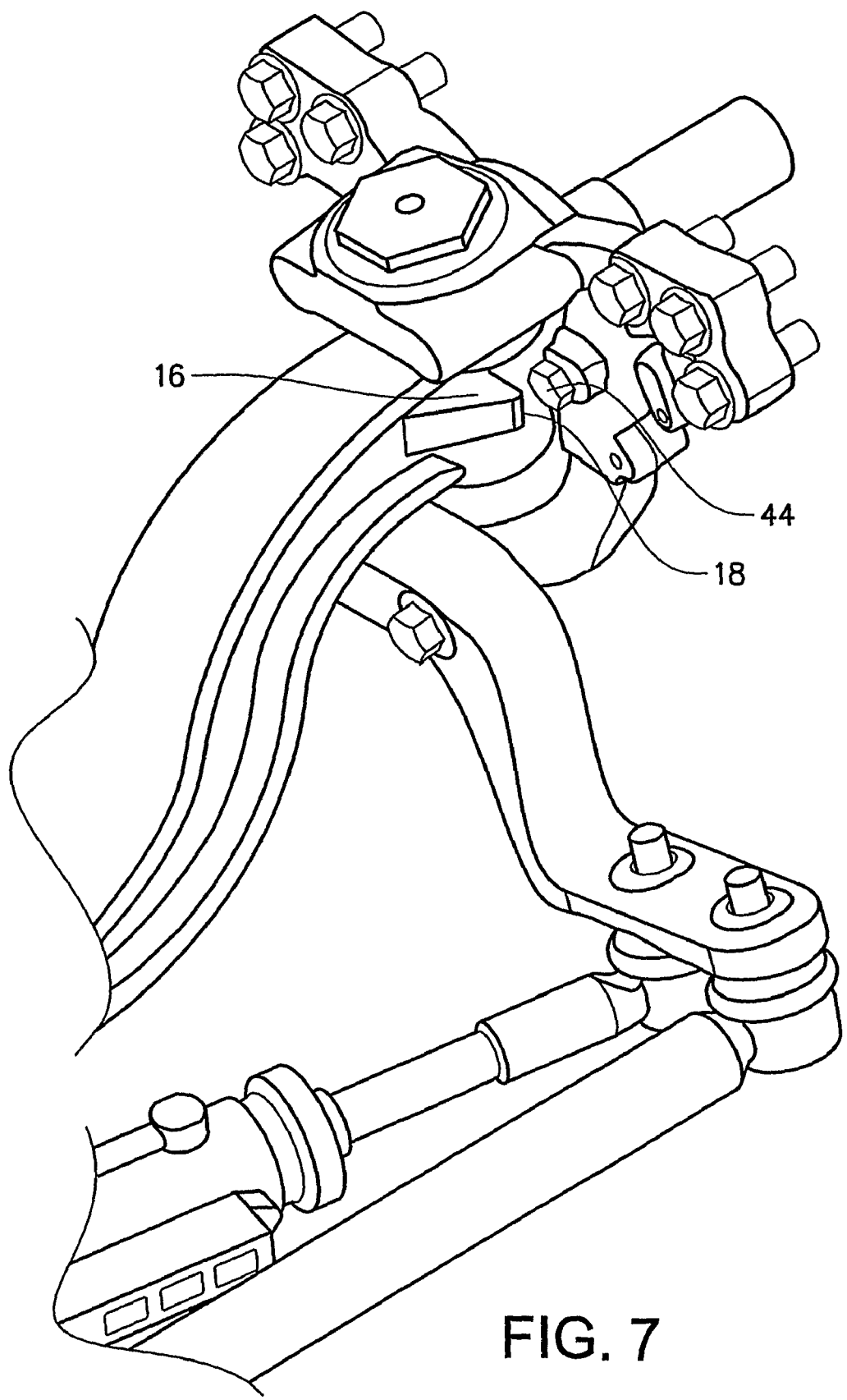
FIG. 7 shows in detail end stops for limiting the deflection of the rotary motion of a wheel spindle, which have been produced from the lug-shaped protrusion.

In FIG. 7, the fastening of the wheel spindle 31b to the axle beam 3 is shown in detail. In the figure, the deflection-limiting surface 18 of the second part 16 is indicated. In addition, a stop face 44 of the wheel spindle 31b is shown. The stop face 44 is arranged so as, together with the deflection-limiting surface 18, to limit the rotary motion of the wheel spindle by preventing further rotation when the surfaces are in contact with each other. In the illustrative embodiment shown, the stop face 44 is configured by a bolt which is fastened in the wheel spindle. Such a configuration makes it easy for the setting of the deflection limitation to be finely adjusted to each vehicle individually. It is also possible to disposed the stop face directly on the material of the wheel spindle.

The invention should not be deemed to be limited to the above-specified embodiment, but can be freely modified within the scope of the following patent claims.

The invention claimed is:

1. A blank for an axle beam for supporting a wheel axle, the blank being formed in one continuous piece and having a bushing for a kingpin for supporting a wheel spindle at each end of the blank, wherein the blank has protrusions at the ends, the protrusions being situated on each side of a plane through longitudinal axes of the bushings, the protrusions each having a first part adapted to define a locking surface for the wheel spindle when the axle beam is used to support a fixed, non-steerable wheel axle, and the protrusions each having a second part adapted to define an end stop for limiting deflection of rotary motion of the wheel spindle when the axle beam is used to support a steerable wheel axle.

2. The blank as claimed in claim 1, wherein the first part of the protrusions lies farther from a midpoint of the axle beam in a longitudinal direction of the axle beam than does the second part.

3. The blank as claimed in claim 2, wherein the first part is adapted to be substantially fully machined away in order to liberate the second part when the axle beam is used to support a steerable axle.

4. The blank as claimed in claim 2, wherein the second part is adapted to be at least partially machined away in order to liberate a bearing surface for a fixing bolt in the first part, when the axle beam is used to support a fixed, non-steerable wheel axle.

5. The blank as claimed in claim 1, wherein the locking surface of the first part is placed beyond the center point, in a longitudinal direction of the axle beam, of a longitudinal axis of each bushing.

6. The blank as claimed in claim 1, wherein the second part is placed within the center point, in a longitudinal direction of the axle beam, of a longitudinal axis of each bushing.

7. The blank as claimed in claim 1, wherein the first part has a greater extent along a longitudinal axis of each bushing than does the second part.

8. The blank as claimed in claim 1, wherein the protrusions are machined to provide a locking surface, when the axle beam is used to support a fixed, non-steerable wheel axle.

9. The blank as claimed in claim 1, wherein each protrusion is a continuous piece comprising the first and second part and an intermediate piece in which the first part merges into the second part.

10. The blank as claimed in claim 1, wherein the protrusions are machined to provide deflection-limiting surfaces, when the axle beam is used to support a steerable wheel axle.

11. A wheel suspension comprising
an axle beam and
a wheel spindle disposed at each end of the axle beam, the wheel spindle having a kingpin mounted in a bushing of the axle beam, the wheel spindles having respective wheel axles,
the axle beam being formed from a blank made in one continuous piece and having the bushings for the kingpin for supporting the wheel spindles at respective ends of the blank, wherein the blank has protrusions on each end of the blank, the protrusions being situated on each side of a plane through longitudinal axes of the bushings, the protrusions being adapted to define locking surfaces for a respective wheel spindle when the axle beam is used to support a fixed, non-steerable wheel axle, and the protrusions are being adapted to define an end stop for limiting deflection of rotary motion of the wheel spindle when the axle beam is used to support a steerable wheel axle.

12. A wheel suspension comprising
an axle beam and
a wheel spindle disposed at each end of the axle beam, the wheel spindle having a kingpin mounted in a bushing of the axle beam, the wheel spindles having respective wheel axles,
the axle beam being formed from a blank made in one continuous piece and the bushings for the kingpin for supporting the wheel spindles at respective ends of the blank, wherein, at each end, the blank has first parts situated on each side of a plane through longitudinal axes of the bushings, the first parts being produced from protrusions and each having a locking surface for the wheel spindles of a fixed, non-steerable wheel axle.

13. The wheel suspension as claimed in claim 12, wherein locking between the wheel spindle and the axle beam is achieved by a locking surface being pressed together against a bearing surface of the wheel spindle, with an intermediate washer placed between the surfaces, by application of a clamping force via a bolt which runs through the first part and the washer, and is arranged in engagement with the wheel spindle.

14. The wheel suspension as claimed in claim 13, wherein the washer is wedge-shaped.

15. The wheel suspension as claimed in claim 14, wherein the washer has an elongated bushing running in a longitudinal direction of the wedge.

16. The wheel suspension as claimed in claim 12, wherein the wheel spindle is fixed to both of the protrusions.

17. A wheel suspension comprising
an axle beam and
a wheel spindle disposed at each end of the axle beam, the wheel spindle having a kingpin which is mounted in a bushing of the axle beam, the wheel spindles having respective wheel axles,
the axle beam being formed from a blank made in one continuous piece and having the bushings for the kingpin for supporting the wheel spindles at respective ends of the blank, wherein the blank has, at each end, parts situated on each side of a plane through longitudinal axes of the bushings, the parts being produced from protrusions to prevent rotation of the wheel spindle about the kingpin when the axle beam is used to support a fixed, non-steerable wheel axle.

18. The wheel suspension as claimed in claim 17, wherein the wheel spindle has stop faces situated on each side of a plane through the longitudinal axes of the bushings, the stop faces being arranged so as to bear against the pails to limit rotation of the wheel spindle when the axle beam is used to support a steerable wheel axle.

19. The wheel suspension as claimed in claim 18, wherein the stop faces are formed from bolts screwed into the wheel spindle.

20. The wheel suspension as claimed in claim 17, wherein the parts are produced from the protrusions by machining away first parts.

21. A method for manufacturing an axle beam formed from a continuous, one piece blank, the blank having bushings at its ends, each bushing for a kingpin for supporting a wheel spindle, the blank having protrusions situated on each side of a plane through longitudinal axes of the bushings, the method comprising one of
producing from the protrusion a first part adapted for use as a locking surface for preventing rotation of the wheel spindle about the kingpin when the axle beam is used to support a fixed, non-steerable wheel axle, and
producing from the protrusion a second part adapted for use as an end stop for limiting the deflection of rotary motion of the wheel spindle when the axle beam is used to support a steerable wheel axle,
wherein one of either the first part and the second part is adapted to be produced from the same blank.

* * * * *